US012573195B2

(12) United States Patent
Han et al.

(10) Patent No.: US 12,573,195 B2
(45) Date of Patent: Mar. 10, 2026

(54) METHOD FOR EVALUATING PERFORMANCE OF IMAGE SIGNAL PROCESSOR

(71) Applicant: Samsung Electronics Co., Ltd., Suwon-si (KR)

(72) Inventors: Subin Han, Suwon-si (KR); Seungwan Jeon, Suwon-si (KR); Sara Lee, Suwon-si (KR); Sungsu Kim, Suwon-si (KR); Yitae Kim, Suwon-si (KR); Heeshin Kim, Suwon-si (KR); Kichrl Park, Suwon-si (KR); Yugyung Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/772,990

(22) Filed: Jul. 15, 2024

(65) Prior Publication Data

US 2025/0086962 A1     Mar. 13, 2025

(30) Foreign Application Priority Data

Sep. 12, 2023     (KR) ........................ 10-2023-0120931
Feb. 16, 2024     (KR) ........................ 10-2024-0022261

(51) Int. Cl.
*G06V 10/98* (2022.01)
*H04N 9/64* (2023.01)
*H04N 25/611* (2023.01)

(52) U.S. Cl.
CPC ........... *G06V 10/993* (2022.01); *H04N 9/646* (2013.01); *H04N 25/611* (2023.01)

(58) Field of Classification Search
CPC ..... G06V 10/993; H04N 9/646; H04N 25/611
See application file for complete search history.

(56) References Cited

U.S. PATENT DOCUMENTS

| | | | |
|---|---|---|---|
| 7,656,437 B2 | 2/2010 | Yamada et al. | |
| 8,731,288 B2 * | 5/2014 | Tsukada | H04N 1/6027 382/167 |
| 11,210,771 B2 * | 12/2021 | Tsutaoka | G06F 16/00 |
| 2008/0317374 A1 * | 12/2008 | Huang | H04N 9/68 348/E9.053 |

(Continued)

FOREIGN PATENT DOCUMENTS

KR          10-1128549 B1     3/2012

OTHER PUBLICATIONS

Lee, et al. "Color Image Distortion Assessment based on Synthetic Ground Truth Recovery," Society for Imaging Science and Technology, IS&T International Symposium on Electronic Imaging, pp. 342-1-342-5 (2002).

*Primary Examiner* — Michael Lee
(74) *Attorney, Agent, or Firm* — Fish & Richardson P.C.

(57) ABSTRACT

A method for evaluating performance of an image signal processor according to various example embodiments includes: selecting at least two target colors from an original image generated by the image signal processor; defining a true color range in each of the target colors and identifying at least one false color pixel having a color deviating from the true color range in the original image; generating a reference image by changing a color of the false color pixel; and calculating a color error between the original image and the reference image.

15 Claims, 16 Drawing Sheets

(56)　　　　　References Cited

U.S. PATENT DOCUMENTS

| | | | |
|---|---|---|---|
| 2009/0244664 A1* | 10/2009 | Kanai | H04N 1/6058 |
| | | | 358/530 |
| 2014/0072214 A1* | 3/2014 | Tanaka | H04N 25/135 |
| | | | 382/165 |
| 2016/0335516 A1* | 11/2016 | Yamamoto | G06F 3/04847 |
| 2017/0367582 A1* | 12/2017 | Wang | A61B 1/043 |
| 2021/0249027 A1 | 8/2021 | Zeghidour et al. | |
| 2022/0036570 A1* | 2/2022 | Aizaki | H04N 1/00774 |
| 2023/0005112 A1* | 1/2023 | Hsu | G06T 5/40 |
| 2024/0169487 A1* | 5/2024 | Chen | G06T 3/40 |

* cited by examiner

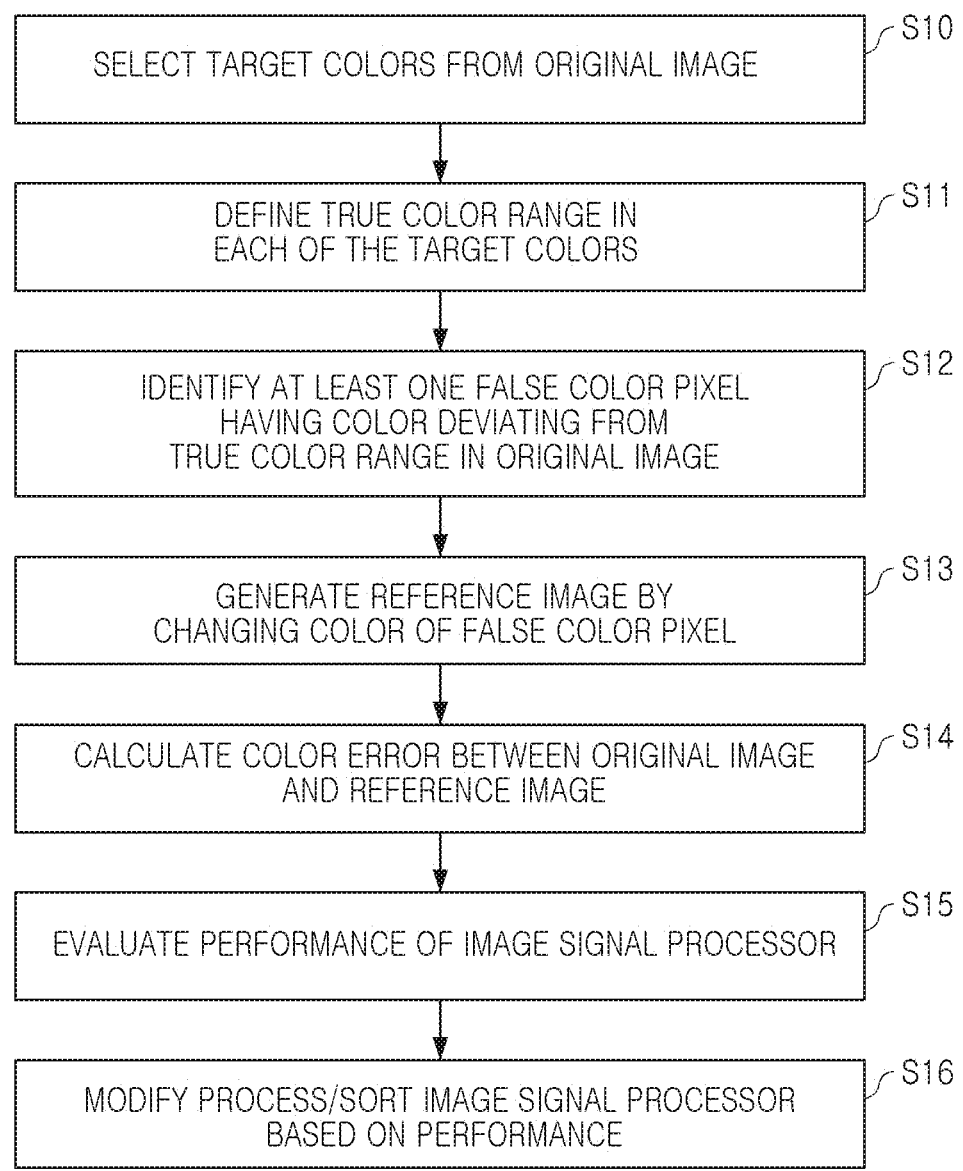

SELECT TARGET COLORS FROM ORIGINAL IMAGE ⌐S10

DEFINE TRUE COLOR RANGE IN
EACH OF THE TARGET COLORS ⌐S11

IDENTIFY AT LEAST ONE FALSE COLOR PIXEL
HAVING COLOR DEVIATING FROM
TRUE COLOR RANGE IN ORIGINAL IMAGE ⌐S12

GENERATE REFERENCE IMAGE BY
CHANGING COLOR OF FALSE COLOR PIXEL ⌐S13

CALCULATE COLOR ERROR BETWEEN ORIGINAL IMAGE
AND REFERENCE IMAGE ⌐S14

EVALUATE PERFORMANCE OF IMAGE SIGNAL PROCESSOR ⌐S15

MODIFY PROCESS/SORT IMAGE SIGNAL PROCESSOR
BASED ON PERFORMANCE ⌐S16

DEFINE A PLURALITY OF CLUSTERS BY ARRANGING AND GROUPING PIXELS BELONGING TO TRUE COLOR RANGE IN COLOR COORDINATE SYSTEM ⌐ S30

MATCHING FALSE COLOR PIXELS TO COLOR COORDINATE SYSTEM ⌐ S31

IDENTIFY CLUSTER CLOSEST TO FALSE COLOR PIXEL ⌐ S32

REPLACE COLOR OF FALSE COLOR PIXEL WITH REPRESENTATIVE COLOR OF CLUSTER HAVING CLOSEST COLOR DISTANCE ⌐ S33

411     412     413

414     415     416

500
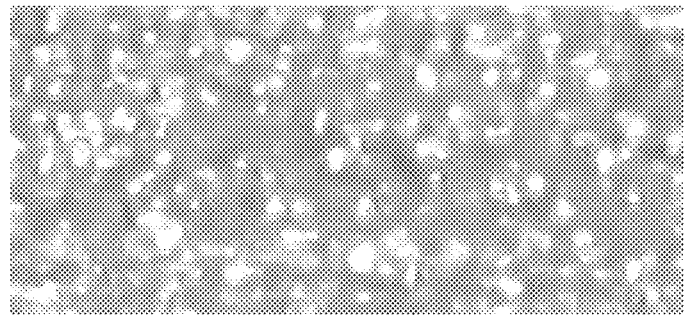
510
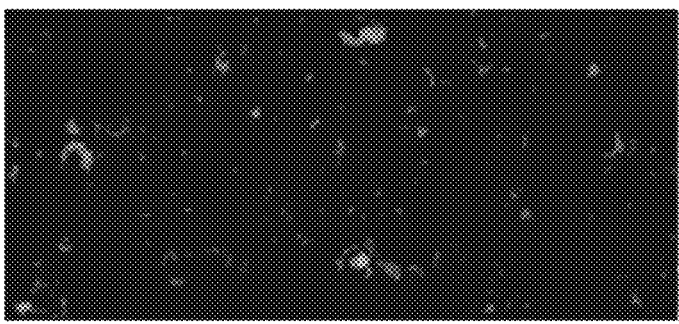
FIG. 13

520
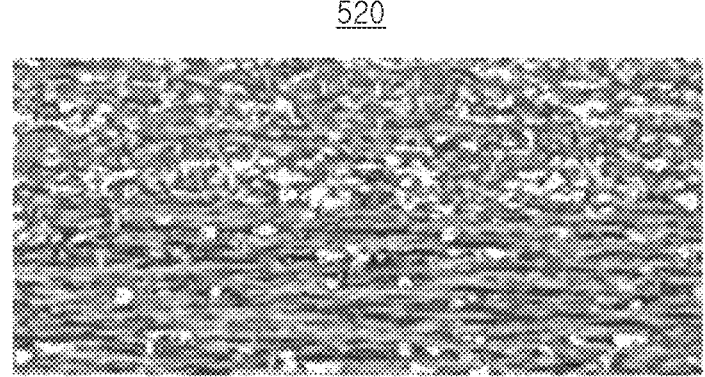
530
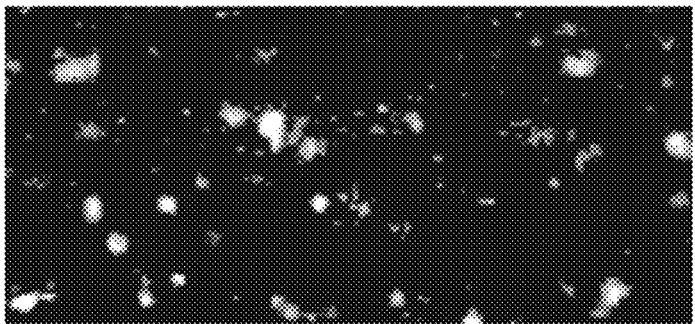
FIG. 14

METHOD FOR EVALUATING PERFORMANCE OF IMAGE SIGNAL PROCESSOR

CROSS-REFERENCE TO RELATED APPLICATION(S)

This application claims benefit of priority to Korean Patent Application Nos. 10-2023-0120931 and 10-2024-0022261 filed on Sep. 12, 2023, and Feb. 16, 2024, in the Korean Intellectual Property Office, the disclosures of each of which are incorporated herein by reference in their entirety.

BACKGROUND

Various example embodiments relate to a method for evaluating performance of an image signal processor.

An image sensor is or includes (or is included in) a semiconductor-based sensor receiving light and generating an electrical signal, and may include a pixel array having a plurality of pixels, a logic circuit that generates raw data by driving the pixel array, and/or the like. The raw data generated by the logic circuit may be transmitted to the image signal processor, and the image signal processor may generate an image using raw data. The quality of an image generated from the same raw data may vary, for example depending on the performance and/or setting of the image signal processor, and thus the performance thereof needs to be accurately or more accurately evaluated in order to set the image signal processor in a good (or optimal) manner.

SUMMARY

Various example embodiments may provide a method for evaluating performance of an image signal processor, which may quantify and/or evaluate and/or improve the performance of an image signal processor. In some cases, there may be an improvement in performance based on the evaluation and/or quantification.

According to some example embodiments, a method for evaluating performance of an image signal processor that is configured to receive raw data from an image sensor and to generate an image includes: selecting at least two target colors from an original image generated by the image signal processor; defining a true color range in each of the target colors; identifying at least one false color pixel having a color deviating from the true color range in the original image; generating a reference image by changing a color of the false color pixel; and calculating a color error between the original image and the reference image.

Alternatively or additionally according to some example embodiments, a method for evaluating performance of an image signal processor includes: obtaining an original image generated by the image signal processor, the obtaining from a system including an image sensor and the image signal processor; generating a reference image by changing a color of at least one pixel included in the original image to an alternative color; generating a color error image by calculating a color error between a pair of pixels at the same coordinate in each of the original image and the reference image; and evaluating performance of the image signal processor using the color error image.

Alternatively or additionally according to some example embodiments, a method for evaluating performance of an image signal processor includes: receiving a first original image generated by the image signal processor having a first setting, the first original image based on raw data received from an image sensor; receiving a second original image generated by the image signal processor having a second setting different from the first setting, the second original image based on the raw data; selecting target colors from each of the first original image and the second original image; identifying first false color pixels for the target colors in the first original image; identifying second false color pixels for the target colors in the second original image; generating a first reference image for the first original image and a second reference image for the second original image by changing colors of each of the first false color pixels and the second false color pixels; and setting the image signal processor to the first setting or the second setting based on a comparison result of the first original image and the first reference image, and on a comparison result of the second original image and the second reference image.

According to various example embodiments, false color pixels from an original image generated by an image signal processor may be selected, and a reference image may be generated in which each color of the false color pixels is replaced with a different color. The color error of pixels with the same coordinates may be calculated in each of the original image and of the reference image, and a performance score of the image signal processor based on color error may be calculated. Accordingly, the performance of the image signal processor may be quantified and more consistently evaluated, and by referring to the performance evaluation results, an image signal processor may be set to generate an optimal or improved resulting image.

Additional advantages and/or effects of inventive concepts are not limited to the foregoing content and may be more easily understood in the process of describing one or more example embodiments.

BRIEF DESCRIPTION OF DRAWINGS

The above and other aspects, features, and advantages of various example embodiments will be more clearly understood from the following detailed description, taken in conjunction with the accompanying drawings, in which:

FIG. 2 is a flowchart illustrating a method of evaluating performance of an image signal processor according to some example embodiments;

FIGS. 13 and 14 are example views illustrating evaluation results according to a method for evaluating performance of an image signal processor according to various example embodiments.

DETAILED DESCRIPTION

Hereinafter, some example embodiments will be described with reference to the accompanying drawings.

Figure 1:
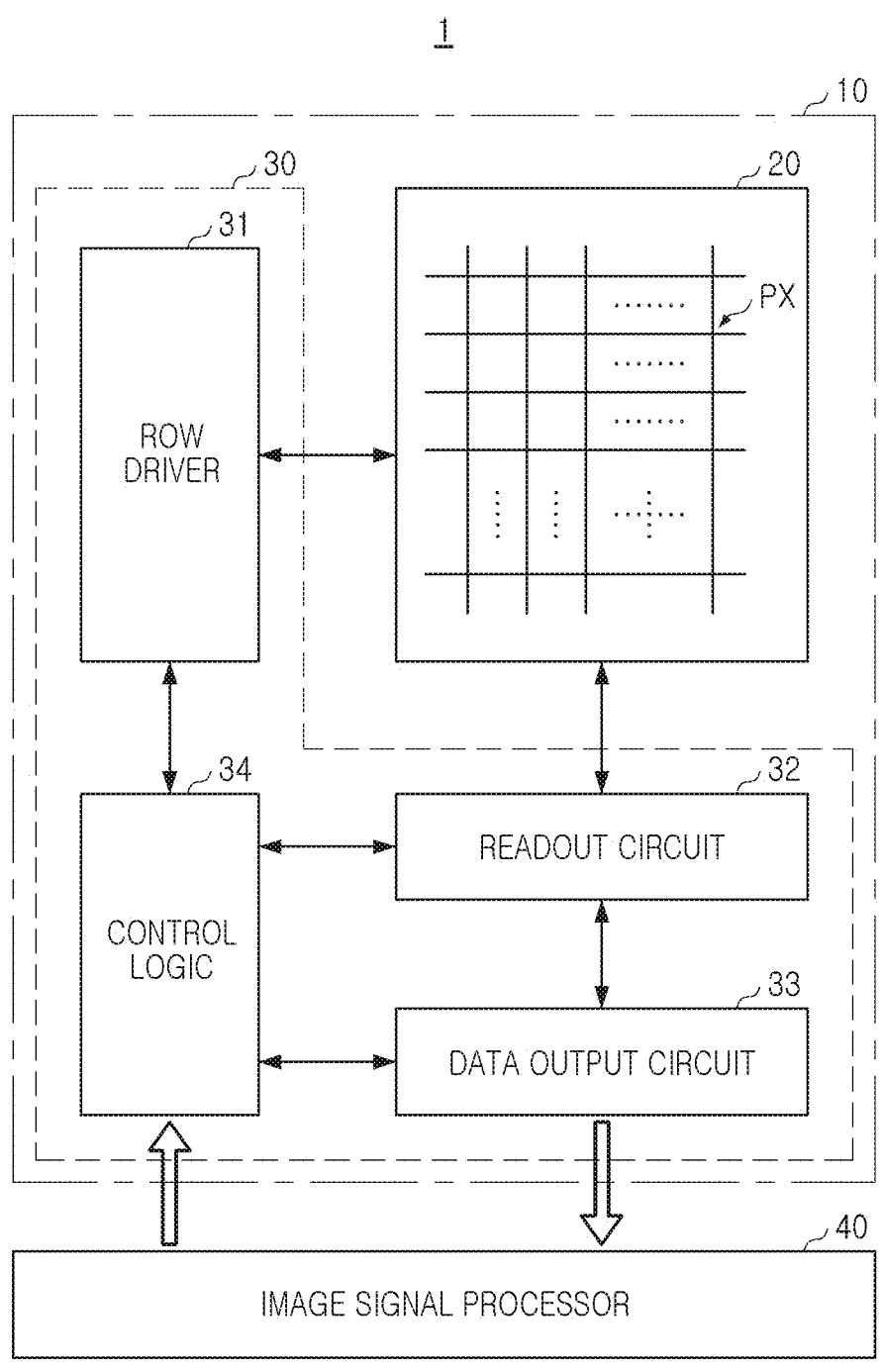
FIG. 1 is a schematic block diagram of a system including an image sensor and an image signal processor according to some example embodiments.

FIG. 1 is a schematic block diagram of a system including an image sensor and an image signal processor according to various example embodiments.

Referring to FIG. 1, a system 1 according to various example embodiments may include an image sensor 10 and an image signal processor 40. The image sensor 10 may include a pixel array 20 and a peripheral circuit 30, and in the pixel array 20, a plurality of pixels PX may be disposed in an array form along a plurality of rows and a plurality of columns. Each of the plurality of pixels may include at least one photoelectric conversion element that generates charge in response to light. The photoelectric conversion element may be or may include a photo diode; however, example embodiments are not limited thereto.

In addition to the photo diode and/or other photoelectric conversion element, each of the plurality of pixels may further include a pixel circuit that converts charges generated by light incident on the photo diode into an electrical signal. In some example embodiments, the pixel circuit may include a plurality of transistors, and in some example embodiments, two or more pixels adjacent to each other may share some of the plurality of transistors.

The peripheral circuit 30 may include circuits for controlling the pixel array 20. For example, the peripheral circuit 30 may include a row driver 31, a readout circuit 32, a data output circuit 33, and a control logic 34. The row driver 31 may simultaneously (or concurrently or overlappingly) drive at least some of pixels PX arranged in the pixel array 20. For example, the row driver 31 may input a control signal (such as a predetermined control signal) to some of the transistors included in each of selected pixels arranged along the selected row line.

The readout circuit 32 may be connected to pixels and column lines. The readout circuit 32 may read a pixel signal through column lines, from selected pixels receiving control signals from the row driver 31. In some example embodiments, the pixel signal may correspond to a difference between reset voltage and pixel voltage detected in each of the selected pixels, and for example, the readout circuit 32 may generate pixel data by converting the pixel signal into a digital signal.

The pixel data generated by the readout circuit 32 may be transmitted to a data output circuit 33, and the data output circuit 33 may output raw data including pixel data through a predetermined interface.

For example, the data output circuit 33 may transmit the raw data to the image signal processor 40. The image signal processor 40 may be packaged together with the image sensor 10, or may be packaged in a separate processor unit along with a central processing unit, a graphics processing unit, a power unit, or the like. The image signal processor 40 may generate an image by processing the raw data.

The control logic 34 may include a timing controller for controlling the operation timing of the row driver 31, the readout circuit 32, and the data output circuit 33. According to some example embodiments, the image sensor 10 may further include a memory that stores raw data, and in this case, the control logic 34 may include a circuit controlling the memory. For example, the memory may be implemented as or include (or be included in) one or more of a dynamic random access memory (DRAM), a static random access memory (SRAM), or the like.

Since the image signal processor 40 processes the raw data output from the image sensor 10 to generate an image, the quality of the image may be affected by the performance and/or settings of the image sensor 10 as well as the image signal processor 40. The image signal processor 40 may be set before the system 1 is shipped. Accordingly, before setting the image signal processor 40 to a good or an optimal state, it may necessary or desirable to accurately evaluate the performance of the image signal processor 40.

In various example embodiments, when the image signal processor 40 generates an original image that may be classified as a high-frequency image (or an image having multiple high-frequency components), a reference image may be generated by identifying a false color pixel in the original image and replacing a color of the false color pixels with another color. By calculating a color error between a pair of pixels disposed at the same coordinates in each of the original image and the reference image, a performance score indicating the performance of the image signal processor 40 may be calculated, and may be used to evaluate the performance of the image signal processor 40 and/or optimize the image signal processor 40. By reducing or minimizing the intervention of an operator's subjective judgment and/or by defining the performance of the image signal processor 40 with a quantified performance score, the performance of the image signal processor 40 may be more accurately and/or more consistently evaluated. In some cases, because of the improved accuracy, sorting of CMOS image sensors may be more accurate, and/or yield may be further improved based on the more accurate sorting.

FIG. 2 is a flowchart illustrating a method of evaluating performance of an image signal processor according to various example embodiments.

Referring to FIG. 2, a method for evaluating performance of an image signal processor according to various example embodiments may select target colors from an original image (S10). The original image may be an image generated by an image signal processor, using raw data generated by a peripheral circuit of an image sensor by using pixel signals obtained from a plurality of pixels. For example, an image signal processor may generate an original image by applying a de-mosaic algorithm to raw data.

The original image may be an image generated for the purpose of evaluating the performance of an image signal processor. However, in order to evaluate the performance of the image signal processor, there is no need to or expectation to be limited to generating an original image by capturing a test chart, and the like, with an image sensor. For example, the original image may be selected as an image with high frequency characteristics when converted to a frequency band (e.g., with a Fourier transform).

In some example embodiments, the original image may be transmitted to a performance evaluation device that evaluates the performance of the image signal processor. The performance evaluation device includes a processor that executes an operation such as a specific (or, alternatively, predetermined) operation and a memory that may store data, and the original image may be stored in the memory.

Once the original image is generated, the performance evaluation device may select target colors from the original image. For example, the performance evaluation device may determine the color of each pixel included in the original image, and may select colors that appear most frequently in the pixels of the original image as target colors.

The performance evaluation device may define a true color range in each of the target colors (S11). For example, the performance evaluation device may generate a color histogram representing the distribution of pixels corresponding to each target color by color, and may select the true color range from the color histogram. In some example embodiments, the true color range may be based on a filtering of the histogram; however, example embodiments are not limited thereto. When a first target color and a second target color are selected from the original image, a true color range of the first target color may be different from a true color range of the second target color.

The performance evaluation device may identify at least one false color pixel having a color deviating, e.g., significantly deviating, from the true color range for each of the target colors in the original image (S12). The false color pixel may be a pixel of which the color is assigned incorrectly during a process in which the image signal processor processes raw data received from the image sensor to generate an original image. The performance evaluation device may generate a reference image by changing the color of the false color pixel identified in operation S12 to another color (S13).

When there are a plurality of false color pixels identified in the original image, the performance evaluation device may change the color of each of, or at least most of, all false color pixels. According to some example embodiments, the color of each of the false color pixels may be changed to one color, or the color of at least some of the false color pixels may be changed to different colors.

The performance evaluation device may calculate a color error between the original image and the reference image (S14). The original image and the reference image may have the same resolution, and thus, a pair of pixels disposed at the same coordinates in the original image and the reference image may match each other. The performance evaluation device may calculate the color error between a pair of pixels disposed at the same coordinates in the original image and the reference image and may use the calculated color error to evaluate the performance of the image signal processor (S15). For example, as the color error between the original image and the reference image is reduced, the performance of the image signal processor may be evaluated to be better.

CMOS image sensors may be manufactured and/or sorted based on an outcome of the evaluation (S16). For example, certain statistics may be generated based on the performance evaluation, and a process may be modified to improve the performance of fabricated CMOS image sensors, based on the evaluation. Alternatively or additionally, the CMOS image sensors may be sorted based on a result of the performance evaluation, and in some cases yield may be improved based on the sorting. In some example embodiments, the performance evaluation may be used in subsequent activities; example embodiments are not limited thereto.

Figure 3:
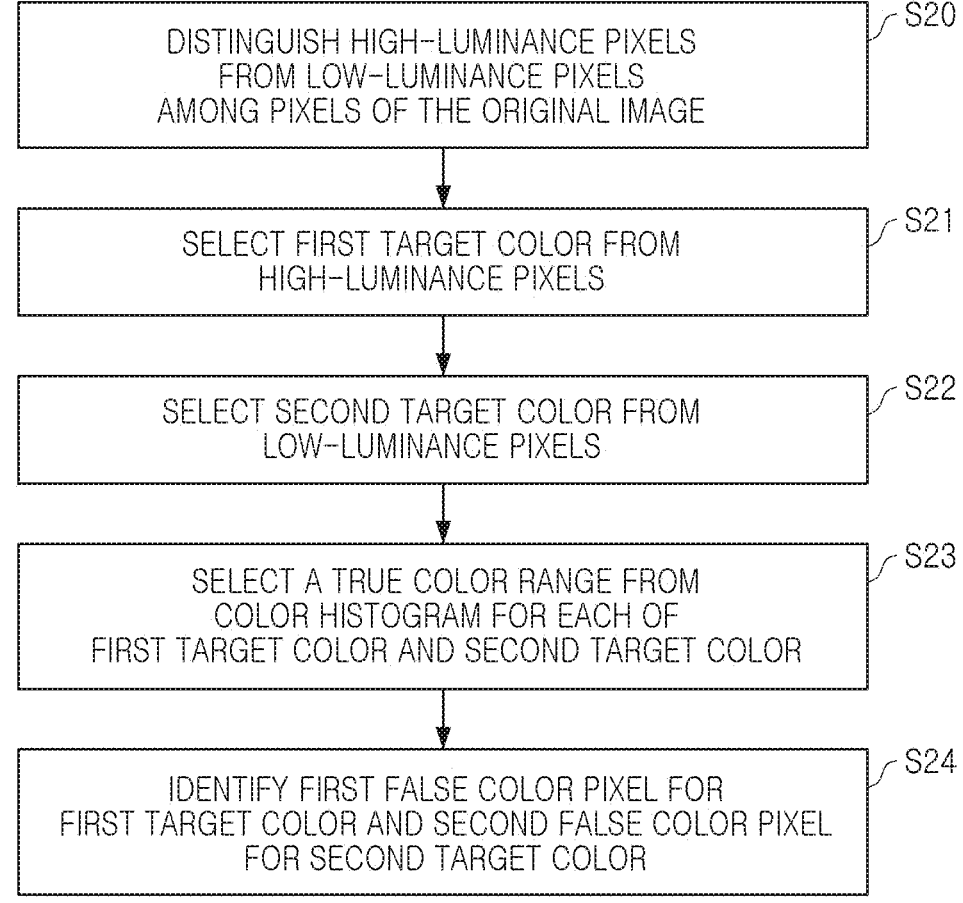
FIG. 3 is a flowchart illustrating a method for evaluating performance of an image signal processor according to some example embodiments.

FIG. 3 is a flowchart illustrating a method for evaluating performance of an image signal processor according to various example embodiments.

FIG. 3 is a flowchart illustrating a method for identifying a false color pixel among a plurality of pixels included in an original image generated by an image signal processor. The performance evaluation device receiving the original image from the image signal processor may distinguish high-luminance pixels and low-luminance pixels from among the pixels of the original image (S20). The performance evaluation device may select a first target color from high-luminance pixels (S21) and may select a second target color from low-luminance pixels (S22).

According to some example embodiments, the performance evaluation device may distinguish a high-luminance region having relatively high luminance and a low-luminance region having relatively low-luminance from within the original image, and may select target colors from each of the high-luminance region and the low-luminance region. The high-luminance region and the low-luminance region may be distinguished by a reference luminance factor (such as a predetermined reference luminance), and/or by a clustering algorithm. In some example embodiments, the performance evaluation device may distinguish between a high-luminance region and a low-luminance region using a K-means algorithm (however, example embodiments are not limited thereto).

A color of each high-luminance pixel included in the high-luminance region may be predominantly influenced by a color of the light source, such as sunlight and/or indoor lighting, and colors of low-luminance pixels included in the low-luminance region may appear in various manners depending on the type of subject. Accordingly, the number of first target colors selected from high-luminance pixels may be less than the number of second target colors selected from low-luminance pixels. In some examples, the performance evaluation device may select one first target color from the high-luminance pixels, and may select two or more second target colors for low-luminance pixels.

The performance evaluation device may generate a color histogram for each of the first target color and the second target color and may select a true color range from the color histogram (S23). In some examples, a first true color range may be selected from a first color histogram indicating the distribution of the first target color, and a second true color range may be selected from a second color histogram indicating the distribution of the second target color. The performance evaluation device may identify a pixel deviating from the first true color range in the first color histogram as a first false color pixel, and may identify a pixel deviating from the second true color range in the second color histogram as a second false color pixel (S24).

In some example embodiments, the true color range of each target color may be set based on a peak value of the color histogram. Additionally or alternatively, according to some example embodiments, the first true color range of the first target color and the second true color range of the second target color may be selected differently. In some examples, when the first target color is selected from high-luminance pixels and the second target color is selected from low-luminance pixels, the first target color range may be set to be narrower than the second target color range.

Figure 4:
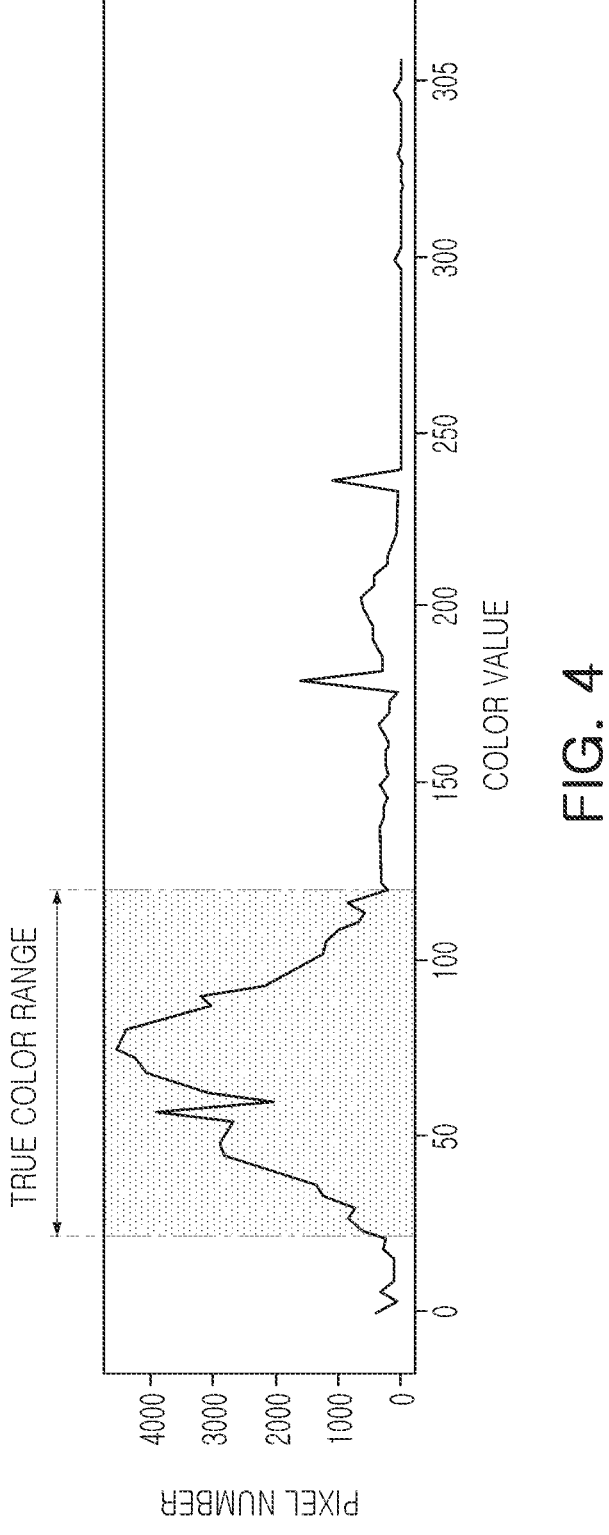
FIGS. 4, 5A, and 5B are views illustrating a method for evaluating performance of an image signal processor according to some example embodiments.
Figure 5A:
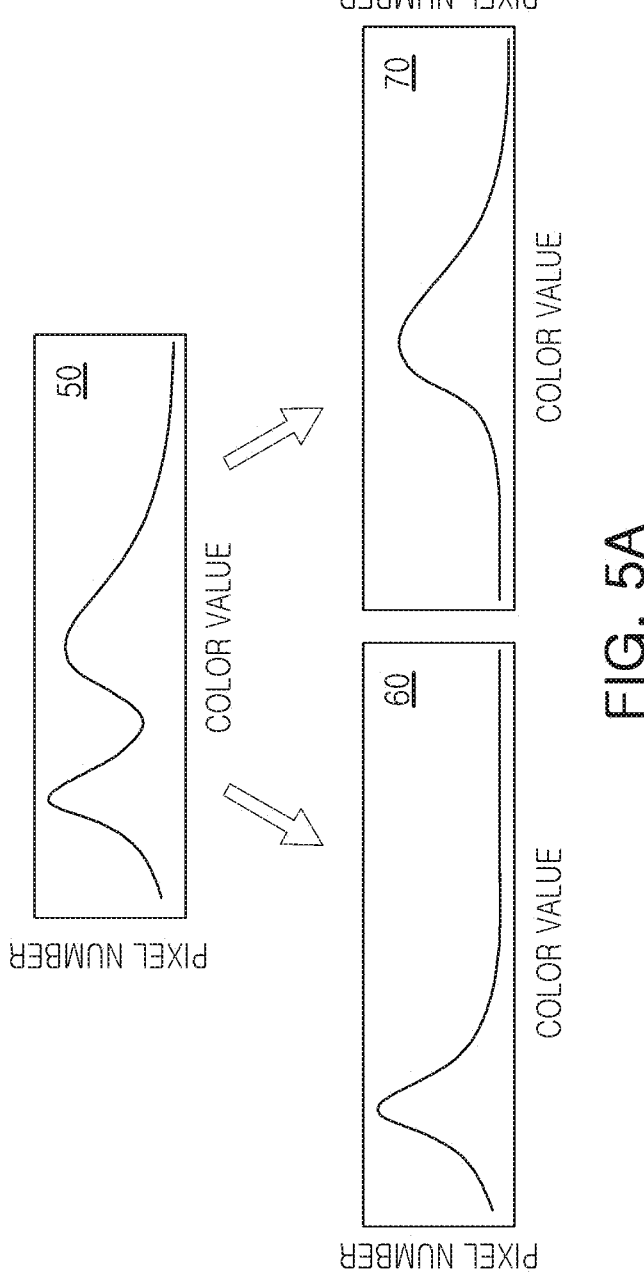
Figure 5B:
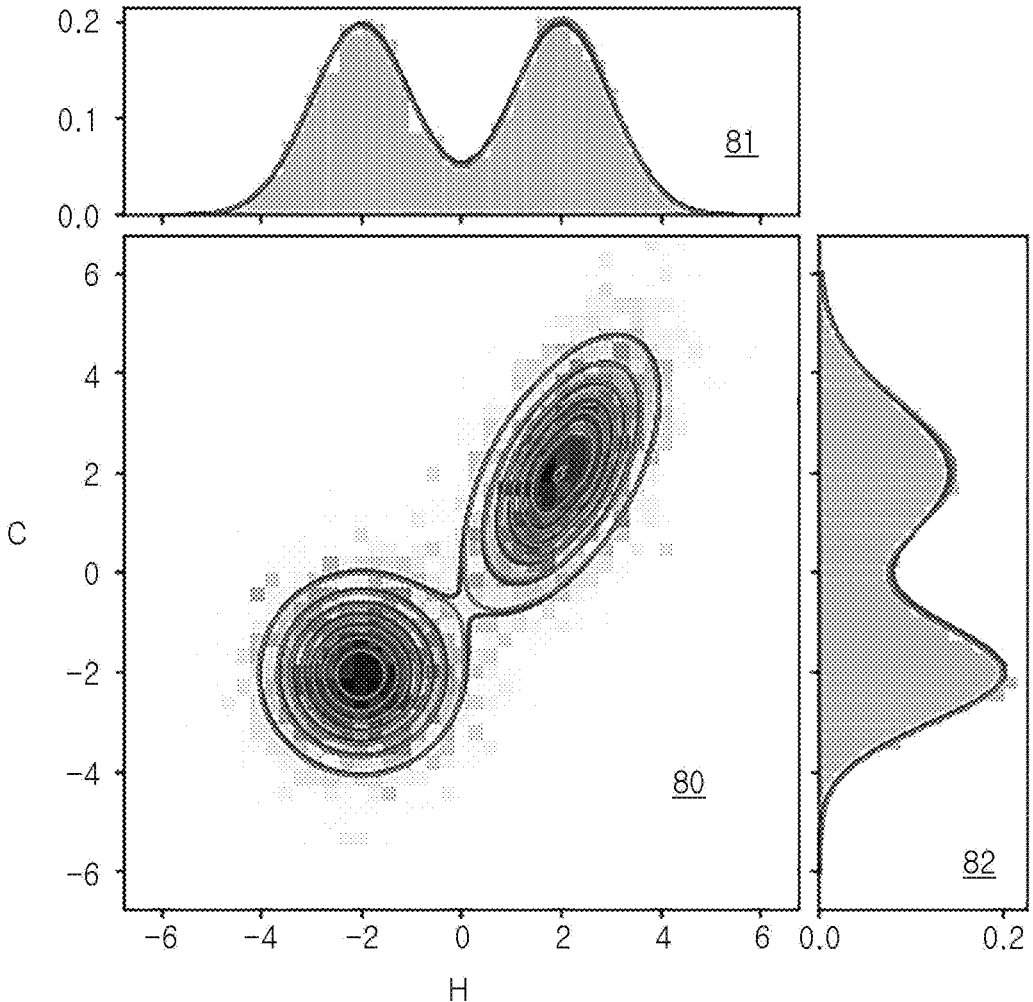

FIGS. 4, 5A and 5B are views illustrating a method for evaluating performance of an image signal processor according to various example embodiments.

FIGS. 4, 5A, and 5B may be views illustrating various example embodiments for selecting a true color range from a target color selected from an original image generated by an image signal processor in order to evaluate the performance of the image signal processor.

For example, a performance evaluation device evaluating the performance of the image signal processor selects a target color from an original image, and may display a color distribution of pixels classified as having the target color as a color histogram, as illustrated in FIG. 4. Referring to FIG. 4, a horizontal axis of the color histogram may correspond to a color value, and a vertical axis thereof may correspond to the number of pixels and/or the frequency at which the color corresponding to the horizontal axis appears. A range such as a dynamically determined (or, alternatively, predetermined) range set based on the color value in which a peak value is displayed in the color histogram may be a true color range.

Meanwhile, as illustrated in FIGS. 5A and 5B, a color histogram may be generated for each target color, for example by using a Gaussian mixture model, and a true color range may be defined in the color distribution. First, referring to FIG. 5A, a color histogram 50 before separation by target color may first be generated in a one-dimensional form. In the color histogram 50, color histograms 60 and 70 in a Gaussian form indicating the color distribution of each of two or more target colors may be generated in response to the Gaussian mixture model.

From the color histogram 50, a first color histogram 60 indicating the color distribution of each target color selected to evaluate the performance of the image signal processor, and a second color histogram 70 may be generated. For example, the first color histogram 60 may display the color distribution of the first target color, and the second color histogram 70 may display the color distribution of the second target color.

The true color range in each of the first color histogram 60 and the second color histogram 70 may also be selected as a range such as a dynamically determined (or, alternatively, predetermined) range based on the peak value. For example, the true color range in each of the first color histogram 60 and the second color histogram 70 may be selected as [peak value ±1.96σ], where σ is one standard deviation. However, a specific true color range may vary, depending on a light source used to capture the original image and the type of subject.

For example, the true color range applied to each of the first color histogram 60 and the second color histogram 70 may be applied differently. For example, a true color range in the first color histogram 60 may be selected as [peak value ±0.68σ], and a true color range in the second color histogram 60 may be selected as [peak value ±1.96σ]. Depending on the type and/or the shape of the light source and subject included in the original image, and the target colors selected in the original image, the true color range to be applied to each color histogram 60 or 70 may be selected in various ways.

Meanwhile, referring to FIG. 5B, a color histogram may be generated for each target color using a Gaussian mixture model defined in an H-C circular coordinate system (where C is S*V), which is a modified version of the HSV color space. As illustrated in FIG. 5B, in the H-C circular coordinate system, a Gaussian mixture model 80 may be defined in a two-dimensional color space defined by a horizontal axis H and a vertical axis C, from which the first Gaussian mixture model 81 and the second Gaussian mixture model 82 may be extracted. The performance evaluation device may generate a two-dimensional color histogram for each target color using each of the first Gaussian mixture model 81 and the second Gaussian mixture model 82, and may apply a true color range thereto. For example, the same true color range may be applied to the two-dimensional color histogram of each of the target colors included in the low-luminance region, or a different true color range may be applied to each of the target colors.

FIGS. 6A to 6D are views illustrating a method for evaluating performance of an image signal processor according to various example embodiments.

Figure 6A:
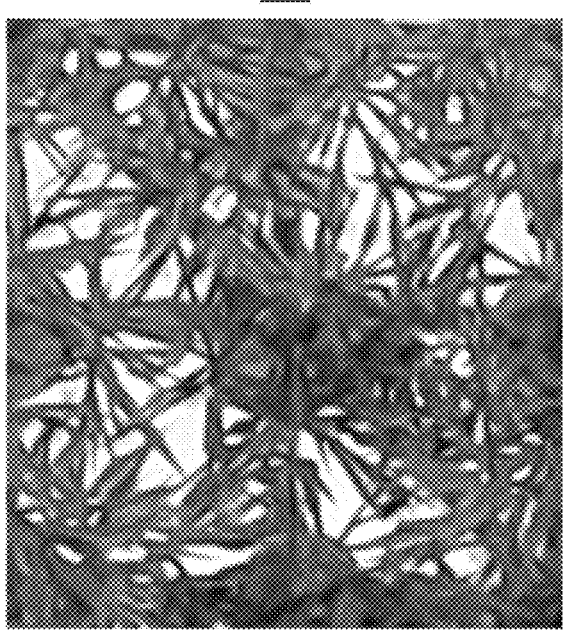
FIGS. 6A to 6D are views illustrating a method for evaluating performance of an image signal processor according to some example embodiments.

First, FIG. 6A may be an example original image 100 generated by an image signal processor using raw data received from an image sensor. In various example embodiments as illustrated in FIG. 6A, the original image 100 may be an image obtained by capturing an artificial turf installed in front of a light source such as a predetermined light source. Accordingly, when converting the original image 100 from a spatial domain to a frequency domain, the original image 100 may have very high frequencies.

Figure 6B:
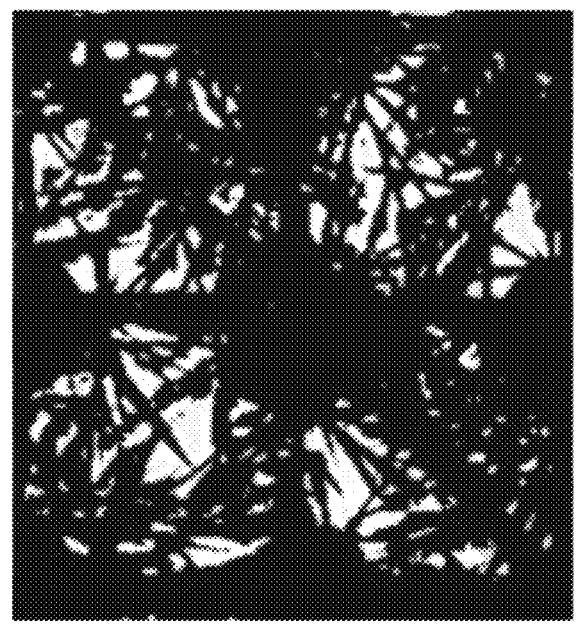
Figure 6C:
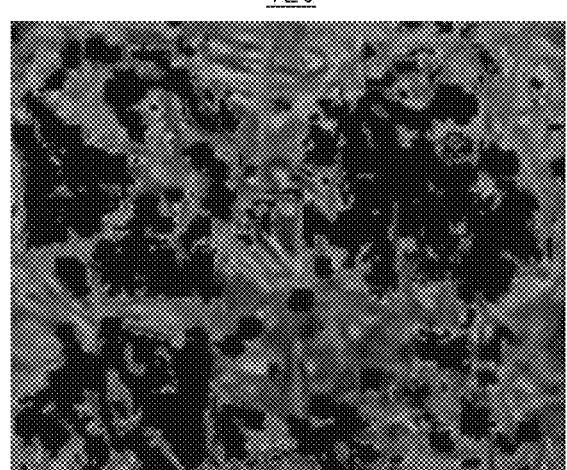

In the process of evaluating the performance of the image signal processor, in the original image 100 according to an example embodiment illustrated in FIG. 6A, white, a main color of the light source, may be selected as a first target color, and green, a main color of grass, may be selected as a second target color. FIG. 6B may be a first image 110 displaying true color pixels determined to fall within the true color range of the first target color selected in the original image 100. Meanwhile, FIG. 6C may be a second image 120 displaying true color pixels determined to fall within the true color range of the second target color selected in the original image 100.

Figure 6D:
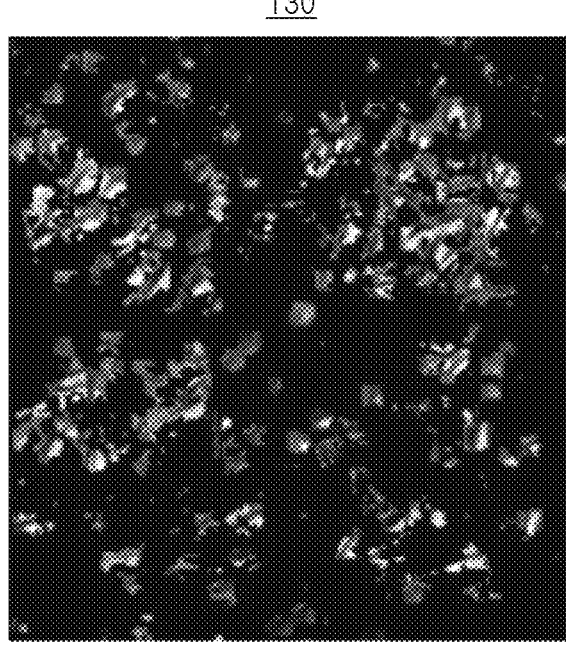

FIG. 6D may be a third image 130 displaying false color pixels deviating from the true color range of the first target color and false color pixels deviating from the true color range of the second target color. As illustrated in FIG. 6D, when false color pixels are identified among the pixels included in the original image 100, a reference image may be generated by changing the color of each false color pixel. Then, a color error between the reference image and the original image 100 may be calculated, based on which the performance of the image signal processor may be evaluated. For example, as the number of false color pixels decrease, the color error between the original image 100 and the reference image may be calculated to decrease. Accordingly, as the color error between the original image 100 and the reference image decrease, the performance of the image signal processor may be evaluated to be better.

Figure 7:
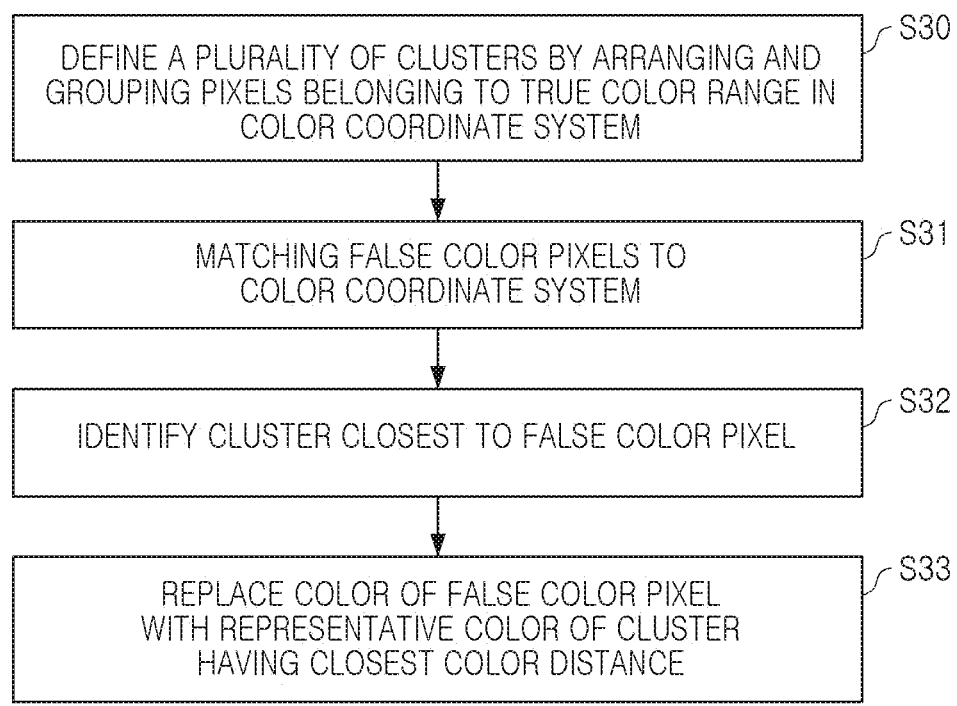
FIG. 7 is a flowchart illustrating a method for evaluating performance of an image signal processor according to some example embodiments.

FIG. 7 is a flowchart illustrating a method for evaluating performance of an image signal processor according to various example embodiments.

FIG. 7 may be or may correspond to a flowchart illustrating a method for changing colors of false color pixels identified from an original image 100, as previously described with reference to FIGS. 6A to 6D. Referring to FIG. 7, a performance evaluation device evaluating the performance of an image signal processor may define a plurality of clusters, by arranging and grouping true color pixels belonging to a true color range of a target color in a color coordinate system (S30). In operation S30, the performance evaluation device may use a clustering algorithm and, for example, may define a plurality of clusters, for example using a K-means algorithm.

Because true color pixels do not have exactly a single color and at least some thereof may have different colors in the true color range, a plurality of clusters may be defined by grouping true color pixels belonging to the true color range. However, according to some example embodiments, only one cluster may be defined with true color pixels.

When clusters are defined in the color coordinate system, the performance evaluation device evaluating the performance of the image signal processor may be arranged by matching false color pixels to the color coordinate system (S31). Coordinates in the color coordinate system may be defined by the color of each false color pixel, so that at least some of the false color pixels may match different positions in the color coordinate system.

The performance evaluation device may identify a closest cluster for the false color pixel in the color coordinate system (S32). For example, when false color pixels are provided in plural form and clusters defined in step S30 are provided in plural form, a cluster defined in the closest distance in the color coordinate system for each false color pixel may be identified.

The performance evaluation device may replace a color of the corresponding false color pixel with a representative color of the closest cluster for the false color pixel in the color coordinate system (S33). In some example embodiments, the representative color of a cluster may be determined as an average color (such as a mean color and/or a median color and/or a mode color) of true color pixels grouped into the corresponding cluster, and/or may also be determined as a color of the true color pixel closest to a center of the cluster, among the true color pixels grouped into the corresponding cluster. Alternatively or additionally, a color of one true color pixel, among the true color pixels grouped into the corresponding cluster, may be selected as the representative color of the corresponding cluster.

As described with reference to FIG. 7, a reference image may be generated by replacing a color of each false color pixel identified in the original image with another color. However, according to some example embodiments, the color of each false color pixel may be replaced in a different manner than described with reference to FIG. 7. For example, the reference image may be generated by changing the color of each false color pixel by decolorizing the color of each false color pixel.

Alternatively or additionally, the method described with reference to FIG. 7 may be applied to some of the plurality of false color pixels to change colors thereof, and a method for decolorizing the remaining colors may be applied thereto. For example, after defining clusters in a color coordinate system and matching false color pixels, a color of a false color pixel in which a cluster exists in a predetermined color distance may be replaced with a representative color of the closest cluster, and colors of false color pixels that do not have clusters in the same color distance may be decolorized.

Figure 8A:
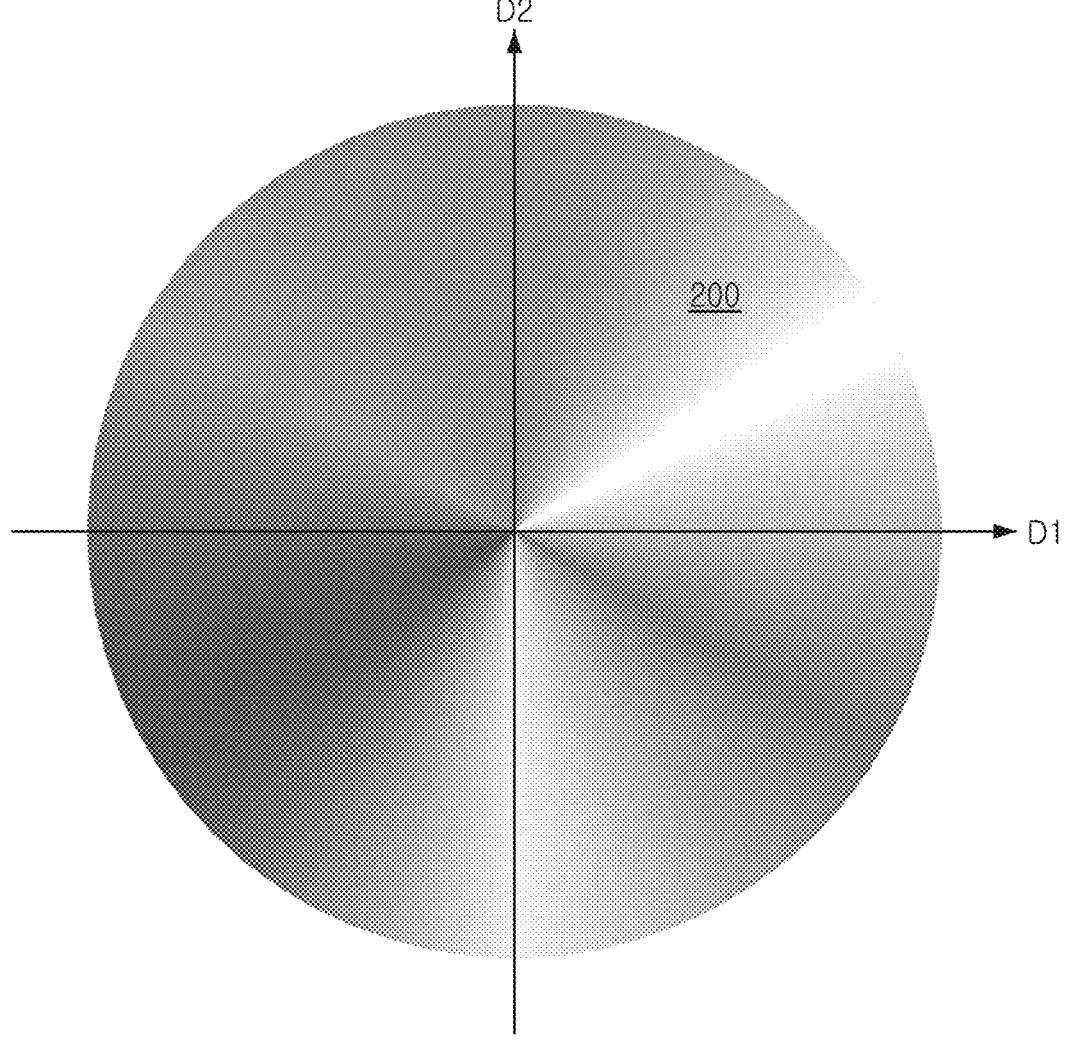
FIGS. 8A and 8B are views illustrating a method for evaluating performance of an image signal processor according to some example embodiments.
Figure 8B:
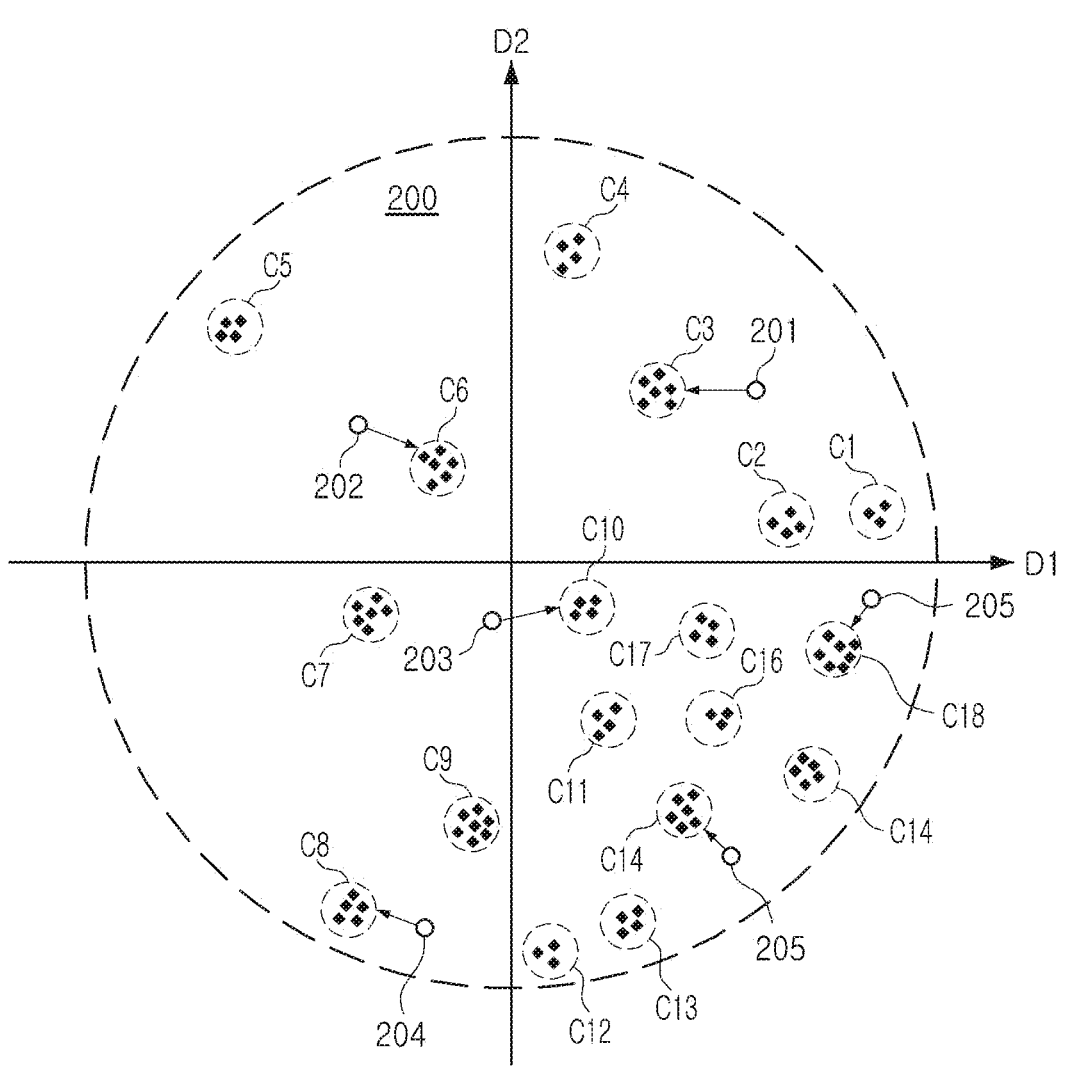

FIGS. 8A and 8B are views illustrating a method for evaluating performance of an image signal processor according to various example embodiments.

FIGS. 8A and 8B may be views illustrating a process of determining a replacement color for changing a color of a false color pixel. First, FIG. 8A may be a view illustrating a color coordinate system 200 used to determine a replacement color for the false color pixel. Referring to FIG. 8A, the color coordinate system 200 may be defined on a plane parallel to a first axis D1 and a second axis D2, intersecting each other (e.g., perpendicular with each other).

As previously described with reference to FIG. 7, a performance evaluation device of an image signal processor may arrange true color pixels belonging to a true color range in the color coordinate system 200, and two or more true colors arranged close to each other in the color coordinate system 200 may be grouped into one cluster. Referring to an example embodiment illustrated in FIG. 8B, first to eighteenth clusters C1 to C18 may be defined by a plurality of true color pixels arranged in the color coordinate system 200.

At least some of the clusters C1 to C18 may be defined by different numbers of true color pixels. For example, a first cluster C1 may include three true color pixels, while a second cluster C2 may include four true color pixels, and a third cluster C3 may include six true color pixels.

When the clusters C1 to C18 are defined with true color pixels, the performance evaluation device may match false color pixels 201 to 206 deviating from a true color range to the color coordinate system 200. In some example embodiments, for example as illustrated in FIG. 8B, it is assumed that the first to sixth false color pixels 201 to 206 are detected from the original image, but the number of false color pixels 201 to 206 may vary, according to an example embodiment. For example, the number of false color pixels 201 to 206 may vary depending on the type of original image, settings of the image signal processor, and the like.

Referring to FIG. 8B, a first false color pixel 301 may be disposed closest to the third cluster C3 based on the color distance in the color coordinate system 200. Accordingly, a color of the first false color pixel 301 may be replaced with a representative color of the third cluster C3. Meanwhile, a second false color pixel 202 may be disposed closest to the sixth cluster C6 among the clusters C1 to C18, and thus, a color of the second false color pixel 202 may be replaced with a representative color of the sixth cluster C6.

The representative color of each of the clusters C1 to C18 may be determined in various manners as described above. For example, a representative color of each cluster C1 to C18 may be determined as an average color of true color pixels included in each of the clusters C1 to C18. Additionally, in some example embodiments, the representative color of each cluster C1 to C18 may be determined as a color of a true color pixel closest to a center of each cluster C1 to C18. Alternatively, the representative color may be determined as a color of any true color pixel among the true color pixels included in each of the clusters C1 to C18.

Figure 9:
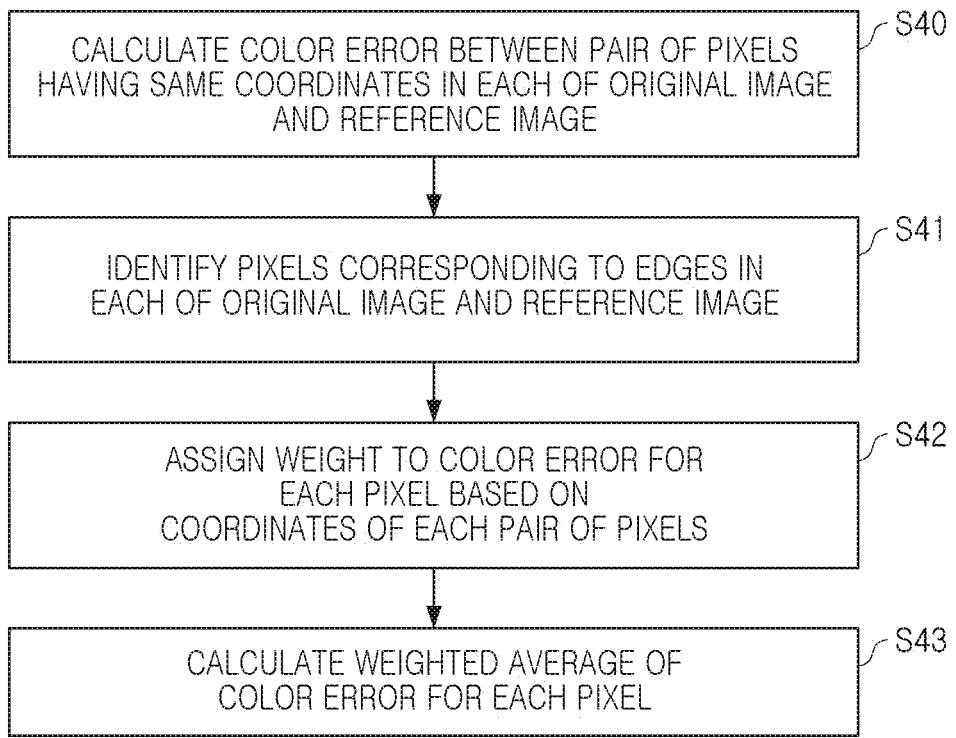
FIG. 9 is a flowchart illustrating a method for evaluating performance of an image signal processor according to some example embodiments.

FIG. 9 is a flowchart illustrating a method for evaluating performance of an image signal processor according to various example embodiments.

FIG. 9 may be a flowchart illustrating a method of quantitatively evaluating the performance of an image signal processor, using a reference image generated by changing a color of a false color pixel. Referring to FIG. 9, the performance evaluation device of the image signal processor may first calculate a color error between a pair of pixels having the same coordinates in each of the original image and the reference image (S40). Since the reference image is generated by changing colors of some false color pixels in an original image generated by the image signal processor, a resolution of the original image may be the same as a resolution of the reference image.

For example, if the resolution of the original image is 4032×3024, the resolution of the reference image may also be 4032×3024, and the color error for each of approximately 12 million pixel pairs may be calculated. In some example embodiments, the color error calculated in operation S40 may be a color distance between a pair of pixels arranged in the color coordinate system 200 described above with reference to FIGS. 8A and 8B.

Meanwhile, the performance evaluation device may identify pixels corresponding to edges in each of the original image and the reference image (S41). When the pixels corresponding to the edge are identified, the performance evaluation device may assign a weight to a color error for each pixel based on the coordinates of each pair of pixels (S42), and a weighted average of the color error for each pixel may be calculated (S43). The weighted average calculated in step S43 may be an evaluation score quantitatively displaying the performance of the image signal processor.

In some example embodiments, the evaluation score may be calculated as in Equation 1, or may be calculated based on Equation 1, below.

$$\text{SCORE} = \left[ \frac{\sum \Delta E(x,\,y)^2 \text{edge}(x,\,y)}{\sum \text{edge}(x,\,y)} \right]^{\frac{1}{2}} \qquad \text{Equation 1}$$

In Equation 1, x and y may represent coordinates of each pixel, and $\Delta E(x,y)$ may be a color error between a pair of pixels disposed at specific coordinates of the original image and the reference image. Meanwhile, edge (x,y) may be a weight applied to pixels of coordinates corresponding to the edge, and the evaluation score SCORE using a power mean as illustrated in Equation 1, so that color errors due to false color pixels may be more dominantly reflected in the average score SCORE. As described above, as the color error due to false color pixels increases, or the number of false color pixels increases, the evaluation score SCORE may increase, and thus, as the evaluation score SCORE decreases, the performance of the image signal processor may be evaluated to be better.

Figure 10:
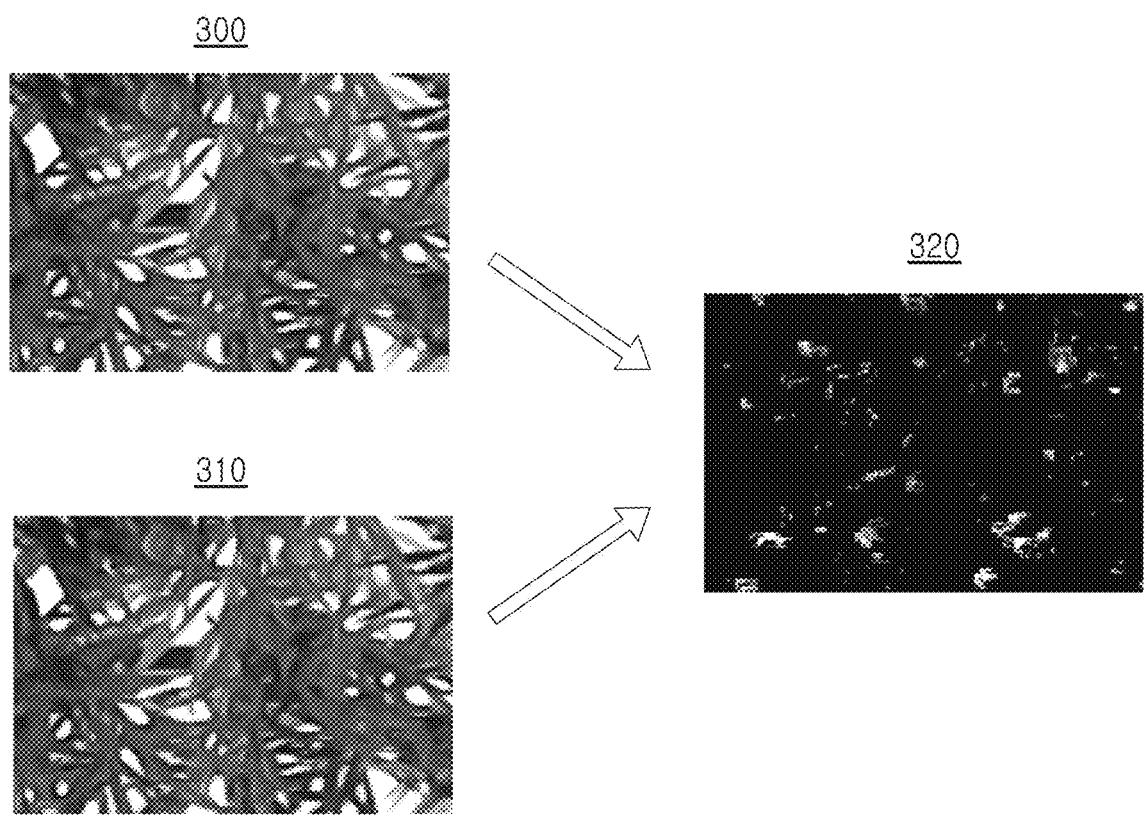
FIG. 10 is a view illustrating a method for evaluating performance of an image signal processor according to some example embodiments.

FIG. 10 is a view illustrating a method for evaluating performance of an image signal processor according to various example embodiments.

Referring to FIG. 10, an original image 300 generated by an image signal processor, and a reference image 310 generated by changing colors of false color pixels identified in the original image 300 to alternative colors are illustrated. As described above, the performance evaluation device of the image signal processor may calculate a color error between a pair of pixels disposed at the same coordinates in each of the original image 300 and the reference image 310.

In some example embodiments for example as illustrated in FIG. 10, the error image 320 may be an image generated from the color error between the pair of pixels disposed at the same coordinates in each of the original image 300 and the reference image 310. The color error between the pair of pixels disposed at the same coordinates in each of the original image 300 and the reference image 310 may be a pixel value of each pixel of the error image 320. In some example embodiments for example as illustrated in FIG. 10, as the color error decreases, the pixel value may be darker, and as the color error increases, the pixel value may be brighter. For example, the pixel value of each pixel included in the error image 320 may be $\Delta E(x,y)$ included in Equation 1 above.

Even assuming that the image sensor generates raw data by capturing the same subject under the same capturing conditions, the original image 300 may be generated differently as the image signal processor changes or the settings of the same image signal processor change. Accordingly, the performance score of the image signal processor calculated by applying the performance evaluation method according to an embodiment of the present disclosure may vary, depending on the image signal processor or the settings of the image signal processor. Accordingly, using the performance evaluation method according to various example embodiments, an image signal processor that may generate an optimal image may be adopted, or the settings of the image signal processor may be optimized.

Figure 11:
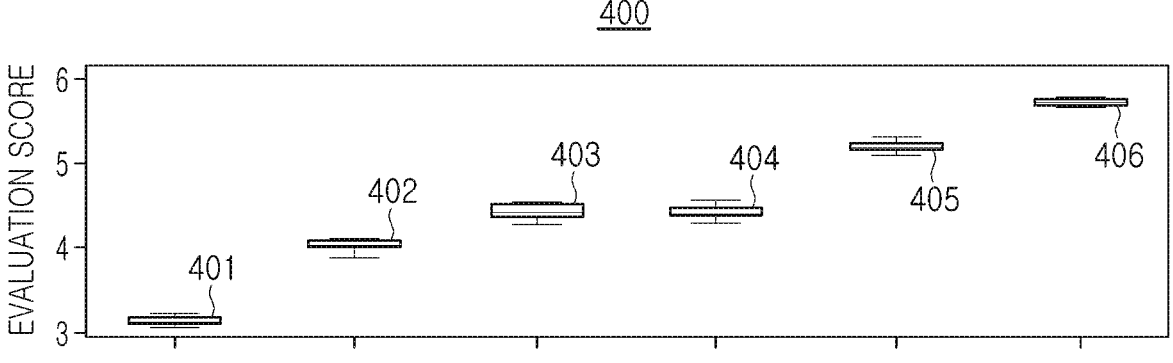
FIGS. 11 and 12 are example views illustrating evaluation results according to a method for evaluating performance of an image signal processor according to some example embodiments.
Figure 12:
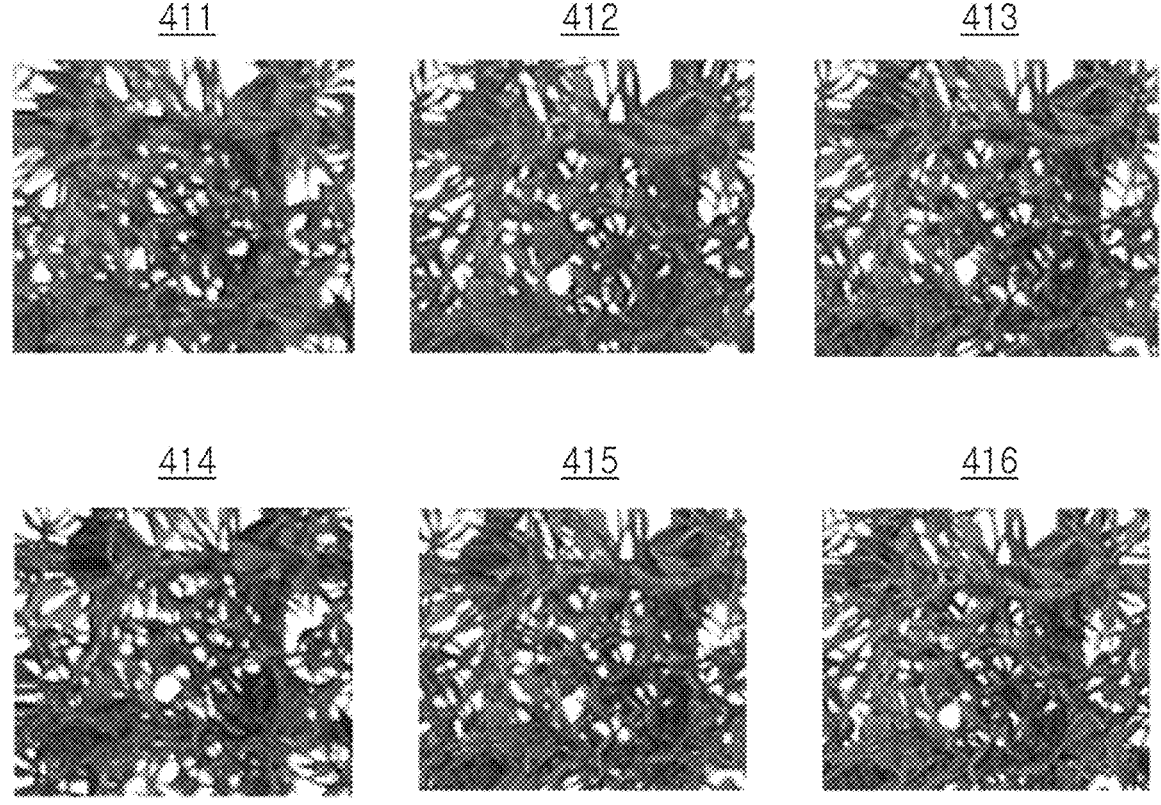

FIGS. 11 and 12 are example views illustrating evaluation results according to a method for evaluating performance of an image signal processor according to various example embodiments.

FIG. 11 may be a graph 400 illustrating first to sixth evaluation scores 401 to 406 obtained by applying a performance evaluation method according to various example embodiments by changing the settings of an image signal processor to the first to sixth settings in a system including an image sensor and the image signal processor. FIG. 12 may be first to sixth original images 411 to 416 generated by an image signal processor set to each of the first to sixth settings using the same raw data received from the image sensor.

For example, a target color may be set in the first original image 411 generated by the image signal processor set to the first setting and the second original image 412 generated by the image signal processor set to the second setting, and false color pixels deviating from the target color may be identified. The same target color may be set for the first original image 411 and the second original image 412. However, due to differences in settings of the image signal processor, the number of false color pixels identified in the first original image 411 may be different from the number of false color pixels identified in the second original image 412.

A performance evaluation device executing a performance evaluation method may generate a first reference image by changing colors of false color pixels identified in the first original image 411, and may generate a second reference image by changing colors of false color pixels identified in the second original image 412. However, since the false color pixels identified in each of the first original image 411 and the second original image 412 are different from each other, the first reference image and the second reference image may also be different from each other.

The performance evaluation device may set the settings of the image signal processor by referring to comparison results between the first original image 411 and the first reference image, and comparison results between the second original image 412 and the second reference image. For example, as illustrated in FIG. 11, the first evaluation score 401 corresponding to the comparison results between the first original image 411 and the first reference image may be calculated to be lower than the second evaluation score 402 corresponding to the comparison results between the second original image 412 and the second reference image. Accordingly, the performance evaluation device may set the image signal processor to a first setting.

As illustrated in FIG. 11, as a result of applying the performance evaluation method according to various example embodiments, the image signal processor may be evaluated as generating the highest quality image in the first setting 401 and as generating the lowest quality image in the sixth setting 406. Referring to FIG. 12, the quality of the first original image 411 generated by the image signal processor in the first setting may be the most improved or the most excellent, and the quality of the sixth original image 416 generated by the image signal processor in the sixth setting may be the worst.

In this manner, the performance of the image signal processor is evaluated based on evaluation scores calculated numerically, it may be possible to objectively evaluate the performance of the image signal processor while minimizing the possibility of the evaluator's subjectivity being involved. Additionally, by applying the performance evaluation method according to various example embodiments, the settings of the image signal processor may be set to output the highest quality image. In an example embodiment described with reference to FIGS. 11 and 12, the image signal processor may be set to the first setting.

FIGS. 13 and 14 are example views illustrating evaluation results according to a method for evaluating performance of an image signal processor according to various example embodiments.

Referring to FIG. 13, a color error image 510 may be generated by applying a performance evaluation method according to various example embodiments to an original image 500. In various example embodiments, false color pixels deviating from a true color range for target colors selected in the original image 500 may be identified, and a reference image may be generated by changing a color of the false color pixels to an alternative color.

Because only the color of false color pixels is selectively changed, the reference image may include the same number of pixels as the original image 500. The color error between a pair of pixels having the same coordinates may be calculated in the reference image and the original image 500, and a color error image 510 having the calculated color error as a pixel value may be generated. Meanwhile, in an example embodiment illustrated in FIG. 14, a color error image 530 may be generated from the original image 520 in the same method.

As illustrated in FIGS. 13 and 14, the color error images 510 and 530 may be black-and-white images. In each of the color error images 510 and 530, with an increase in the color error as a pixel value, the pixel may be displayed as being brighter, and with a decrease in the color error, the pixel may be displayed as being the darker. Accordingly, as compared to the example embodiment illustrated in FIG. 13, the performance evaluation method in the embodiment shown in FIG. 14 may calculate a higher evaluation score, and may evaluate poor performance of the image signal processor. Assuming that a single image signal processor is set differently to generate the first original image 500 and the second original image 520, the image signal processor may be set to the settings used when the first original image 500 was generated and installed in a system.

Various performance evaluation methods of the image signal processor using the color error images 510 and 530 may be selected. For example, as previously described with reference to Equation 1, the weighted average may calculated in a manner that a predetermined first weight may be applied to the color error, which is the pixel value of each of some pixels having coordinates corresponding to the edge, and a second weight lower than the first weight may be applied to the color error, which is the pixel value of each of the remaining pixels having coordinates that do not correspond to the edge, thereby calculating an evaluation score indicating the performance of the image signal processor. Alternatively or additionally, using the characteristic that as the color error increases, the pixel is displayed more brightly in the color error images 510 and 530, the performance of the image signal processor may be evaluated using results of summing pixel values from each of the color error images 510 and 530.

Any of the elements and/or functional blocks disclosed above may include or be implemented in processing circuitry such as hardware including logic circuits; a hardware/software combination such as a processor executing software; or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc. The processing circuitry may include electrical components such as at least one of transistors, resistors, capacitors, etc. The processing circuitry may include electrical components such as logic gates including at least one of AND gates, OR gates, NAND gates, NOT gates, etc.

Inventive concepts are not limited to the above-described example embodiments and the accompanying drawings but is defined by the appended claims. Therefore, those of ordinary skill in the art may make various replacements, modifications, or changes without departing from the scope of the present disclosure defined by the appended claims, and these replacements, modifications, or changes should be construed as being included in the scope of inventive concepts. Furthermore, example embodiments are not necessarily mutually exclusive with one another. For example, some example embodiments may include one or more features described with reference to one or more figures, and may also include one or more other features described with reference to one or more other figures.

What is claimed is:

1. A method for evaluating performance of an image signal processor that is configured to receive raw data from an image sensor and to generate an image, the method comprising:

selecting at least two target colors from an original image generated by the image signal processor;

defining a true color range in each of the target colors;

identifying at least one false color pixel having a color deviating from the true color range in the original image;

generating a reference image by changing a color of the false color pixel; and calculating a color error between the original image and the reference image.

2. The method for evaluating performance of the image signal processor of claim 1, wherein the selecting the at least two target colors comprises:

defining high-luminance pixels in which a luminance level thereof is equal to or higher than a reference luminance level and low-luminance pixels in which a luminance level thereof is lower than the reference luminance level in the original image;

selecting a first target color from the high-luminance pixels; and selecting a second target color different from the first target color from the low-luminance pixels.

3. The method for evaluating performance of the image signal processor of claim 2, wherein the second target color includes two or more different target colors.

4. The method for evaluating performance of the image signal processor of claim 1, wherein in the generating the reference image, the method includes generating the reference image by decolorizing the at least one false color pixel.

5. The method for evaluating performance of the image signal processor of claim 1, wherein the generating the reference image comprises:

defining a plurality of clusters by grouping true color pixels having a color belonging to the true color range in a color coordinate system, and generating the reference image by replacing a color of the false color pixel with a representative color of one cluster corresponding to a closest color distance to a color of the false color pixel in the color coordinate system.

6. The method for evaluating performance of the image signal processor of claim 5, wherein a representative color of each of the plurality of clusters is based on an average color of the true color pixels included in each of the plurality of clusters.

7. The method for evaluating performance of the image signal processor of claim 5, wherein a representative color of each of the plurality of clusters is based on a color of one true color pixel among the true color pixels included in each of the plurality of clusters.

8. The method for evaluating performance of the image signal processor of claim 7, wherein the one true color pixel corresponds to a pixel closest to a center of each of the plurality of clusters among the true color pixels included in each of the plurality of clusters.

9. The method for evaluating performance of the image signal processor of claim 1, wherein the calculating the color error comprises:

calculating a color error for each pixel by calculating a color difference between a pair of pixels having a same coordinate in each of the original image and the reference image, and calculating the color error by calculating a weighted average of the color error for each pixel.

10. The method for evaluating performance of the image signal processor of claim 9, wherein the color error for each pixel is based on a color distance between the pair of pixels calculated in a color coordinate system.

11. The method for evaluating performance of the image signal processor of claim 9, wherein the weighted average is calculated based on a first weight being applied to a color difference between the pair of pixels having coordinates corresponding to an edge in each of the original image and the reference image, and a second weight smaller than the first weight being applied to a color difference between the pair of pixels having coordinates that do not correspond to the edge.

12. The method for evaluating performance of the image signal processor of claim 9, wherein the weighted average is based on a power mean of the color error for each pixel.

13. A method for evaluating performance of an image signal processor, the method comprising:

receiving a first original image generated by the image signal processor of a first setting based on raw data received, the receiving a first original image being from an image sensor;

receiving a second original image generated by the image signal processor of a second setting different from the first setting, the receiving a second original image based on the raw data;

selecting target colors from each of the first original image and the second original image;

identifying first false color pixels for the target colors in the first original image and identifying second false color pixels for the target colors in the second original image;

generating a first reference image for the first original image and a second reference image for the second original image by changing colors of each of the first false color pixels and the second false color pixels; and setting the image signal processor to the first setting or to the second setting based on a comparison result of the first original image and the first reference image, and on a comparison result of the second original image and the second reference image.

14. The method for evaluating performance of the image signal processor of claim 13, wherein the method includes calculating a first evaluation score indicating a difference between the first original image and the first reference image, and a second evaluation score indicating a difference between the second original image and the second reference image, and in response to the first evaluation score being lower than the second evaluation score, the image signal processor is set to the first setting, and in response to the first evaluation score being higher than the second evaluation score, the image signal processor is set to the second setting.

15. The method for evaluating performance of the image signal processor of claim 13, wherein a number of pixels included in the first original image is equal to a number of pixels included in the second original image, and a number of first false color pixels is different from a number of second false color pixels.

* * * * *